United States Patent
Ghabra et al.

(10) Patent No.: US 9,554,286 B2
(45) Date of Patent: Jan. 24, 2017

(54) APPARATUS AND METHOD FOR DETECTING A LOCATION OF A WIRELESS DEVICE

(71) Applicant: Lear Corporation, Southfield, MI (US)

(72) Inventors: Riad Ghabra, Northville, MI (US); Keith A. Christenson, Canton, MI (US)

(73) Assignee: Lear Corporation, Southfield, MI (US)

( * ) Notice: Subject to any disclaimer, the term of this patent is extended or adjusted under 35 U.S.C. 154(b) by 528 days.

(21) Appl. No.: 13/675,642

(22) Filed: Nov. 13, 2012

(65) Prior Publication Data

US 2013/0143594 A1 Jun. 6, 2013

Related U.S. Application Data

(60) Provisional application No. 61/566,339, filed on Dec. 2, 2011.

(51) Int. Cl.
*H04W 24/00* (2009.01)
*B60R 25/24* (2013.01)
(Continued)

(52) U.S. Cl.
CPC ............ *H04W 24/00* (2013.01); *B60R 25/245* (2013.01); *G01S 5/10* (2013.01); *G01S 13/46* (2013.01);
(Continued)

(58) Field of Classification Search
CPC ........ H04W 24/00; B60R 25/245; G01S 5/10; G01S 13/46; G01S 2013/466; G07C 2209/63
See application file for complete search history.

(56) References Cited

U.S. PATENT DOCUMENTS 7,978,049 B2    7/2011  Leitch
8,319,605 B2 *  11/2012 Hassan .................. G01C 17/38
                                              340/10.2
(Continued)

FOREIGN PATENT DOCUMENTS

CN      1981208 A      6/2007
DE      19957536 A1    6/2001
(Continued)

OTHER PUBLICATIONS

German Office Action for corresponding Application No. 10 2012 222 083.6, mailed Oct. 17, 2013, 5 pages.
(Continued)

*Primary Examiner* — Mehmood B Khan
(74) *Attorney, Agent, or Firm* — Brooks Kushman P.C.

(57) ABSTRACT

In at least one embodiment, an apparatus for determining a location of a portable wireless device in relation to a vehicle is provided. The apparatus comprises a first base station that includes a first transceiver for being positioned about a vehicle. The first transceiver is configured to operate at a first operating frequency for transmitting and receiving at least one first signal to and from the portable wireless device to provide a first distance of the portable wireless device with respect to the vehicle. The first operating frequency generally corresponds to a distance accuracy value and the first distance generally corresponds to an actual distance of the portable wireless device from the vehicle that is adjusted by the distance accuracy value.

9 Claims, 3 Drawing Sheets

(51) Int. Cl.
*G01S 13/46* (2006.01)
*G01S 5/10* (2006.01)

(52) U.S. Cl.
CPC ..... *G01S 2013/466* (2013.01); *G07C 2209/63* (2013.01)

(56) References Cited

U.S. PATENT DOCUMENTS

| | | | |
|---|---|---|---|
| 8,319,616 B2 | 11/2012 | Girard, III et al. | |
| 8,589,033 B2* | 11/2013 | Rafii | G06T 7/2053 318/286 |
| 2002/0008615 A1 | 1/2002 | Heide et al. | |
| 2003/0013146 A1* | 1/2003 | Werb | G01V 15/00 435/9 |
| 2003/0197640 A9* | 10/2003 | Johnson | B60R 25/33 342/357.75 |
| 2004/0178883 A1* | 9/2004 | Haselsteiner | B60R 25/24 340/5.72 |
| 2006/0114100 A1* | 6/2006 | Ghabra | E05B 81/78 340/5.61 |
| 2006/0197652 A1* | 9/2006 | Hild | G06K 7/0008 340/10.2 |
| 2007/0090965 A1* | 4/2007 | McCall | G08B 21/24 340/8.1 |
| 2008/0204322 A1 | 8/2008 | Oswald et al. | |
| 2008/0252293 A1* | 10/2008 | Lagae | G01S 7/411 324/318 |
| 2008/0284564 A1* | 11/2008 | Leitch | B60R 25/24 340/5.61 |
| 2010/0076622 A1* | 3/2010 | Dickerhoof | B60R 25/24 701/2 |
| 2010/0171642 A1* | 7/2010 | Hassan | G01C 17/38 340/992 |
| 2010/0305779 A1* | 12/2010 | Hassan | G01C 17/38 701/2 |
| 2010/0321154 A1* | 12/2010 | Ghabra | B60R 25/00 340/5.61 |
| 2011/0148573 A1 | 6/2011 | Ghabra et al. | |
| 2011/0267186 A1* | 11/2011 | Rao | B60K 28/08 340/449 |
| 2012/0044093 A1* | 2/2012 | Pala | G01S 7/4863 340/963 |
| 2012/0218128 A1* | 8/2012 | Tieman | G01S 1/66 340/989 |
| 2013/0069760 A1* | 3/2013 | Lickfelt | H04B 17/29 340/5.61 |
| 2013/0185072 A1* | 7/2013 | Huang | G10L 21/06 704/246 |
| 2014/0330449 A1 | 11/2014 | Oman et al. | |

FOREIGN PATENT DOCUMENTS

| | | |
|---|---|---|
| DE | 102010042302 A1 | 5/2011 |
| JP | 2009155864 A | 7/2009 |
| WO | 0206766 A1 | 1/2002 |
| WO | 2005088561 A2 | 9/2005 |
| WO | 2005114593 A1 | 12/2005 |
| WO | 2006059296 A1 | 6/2006 |

OTHER PUBLICATIONS

Chinese Office Action for corresponding Application No. 201210509040.X, mailed Jun. 27, 2014, 9 pages.
Great Britain Search Report for corresponding Application No. GB1221597.6, mailed May 28, 2013, 5 pages.
German Office Action for corresponding Application No. 10 2012 222 083.6, mailed Nov. 24, 2015, 4 pages.
German Office Action for corresponding Application No. 10 2012 222 083.6, mailed Jan. 20, 2016, 26 pages.
Tüchler et al., "Location accuracy of an UWB localization system in a multi-path environment", IEEE International Conference on Ultra-Wideband, Zurich, Sep. 2005, 6 pages.

* cited by examiner

APPARATUS AND METHOD FOR DETECTING A LOCATION OF A WIRELESS DEVICE

CROSS-REFERENCE TO RELATED APPLICATIONS

This application claims the benefit of U.S. provisional Application No. 61/566,339 filed Dec. 2, 2011, the disclosure of which is incorporated in its entirety by reference herein.

TECHNICAL FIELD

Embodiments of the present disclosure generally provide for an apparatus and method for detecting a location of a wireless device about a vehicle.

BACKGROUND

It is known to detect the location of a wireless device in relation to a vehicle. One implementation for detecting the location of the wireless device in relation to the vehicle is set forth directly below.

U.S. Patent Publication No. 2010/0076622 to Dickerhoof et al. provides a system for determining the location of a wireless device with respect to a vehicle. The system comprises a plurality of antennas positioned about the vehicle for receiving a wireless signal from the wireless device. The wireless signal corresponds to at least one of a command and status related to a predetermined vehicle operation. The system further comprises a controller operably coupled to each antenna. The controller is configured to generate a location signal indicative of the location of the wireless device based on the arrival time of the wireless signal at one or more antennas of the plurality of antennas and to control the operation of the predetermined vehicle operation based on the location signal.

SUMMARY

In at least one embodiment, an apparatus for determining a location of a portable wireless device in relation to a vehicle is provided. The apparatus comprises a first base station that includes a first transceiver for being positioned about a vehicle. The first transceiver is configured to operate at a first operating frequency for transmitting and receiving at least one first signal to and from the portable wireless device to provide a first distance of the portable wireless device with respect to the vehicle. The first operating frequency generally corresponds to a distance accuracy value and the first distance generally corresponds to an actual distance of the portable wireless device from the vehicle that is adjusted by the distance accuracy value.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform any number of the operation(s) as disclosed herein.

Figure 1:
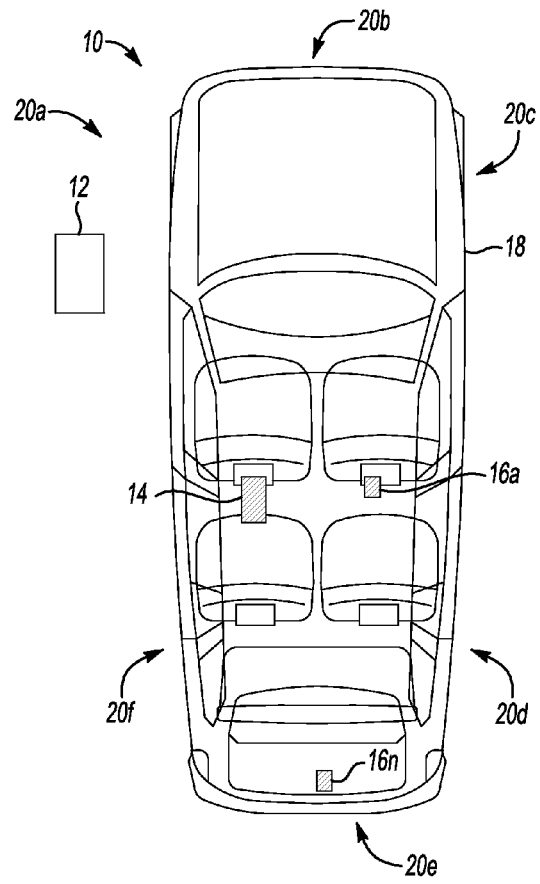
FIG. 1 depicts an apparatus for detecting a location of a wireless device in accordance to one embodiment.

FIG. 1 depicts an apparatus 10 for detecting a location of a wireless device 12 in accordance to one embodiment. The wireless device 12 may be implemented as a key fob or other suitable device that is used to gain entry into a vehicle 18. The apparatus 10 comprises a main base station 14 and at least two auxiliary base stations 16a-16n ("16") for detecting the location of the wireless device 12 with respect to a vehicle 18. For example, the main base station 14 and the auxiliary base stations 16 each include a transmitter/receiver ("transceiver") for wirelessly transmitting/receiving signals to/from the wireless device 12. The transmitter/receiver for each of the wireless device 12, the main base station 14, and the auxiliary device 16 will be discussed in more detail in connection with FIGS. 2-3.

The main base station 14 generally includes additional circuitry to lock and unlock the vehicle 18 in response to command signals as provided by the wireless device 12. The apparatus 10 may perform a passive entry passive start (PEPS) function in which the main base station 14 may unlock the vehicle 18 in response to determining that the wireless device 12 is positioned in a corresponding zone (or quadrant) 20a-20n (i.e., front driver side zone, vehicle front zone, front passenger side zone, rear passenger side zone, vehicle rear zone, and rear driver side zone, respectively) about the vehicle 18. For example, the zones 20 generally correspond to predetermined authorized locations about the vehicle 18 (e.g., interior to and exterior to the vehicle 18) such that if the wireless device 12 is detected to be in one of such zones 20, then the main base station 14 may automatically unlock the vehicle (or door) proximate to zone 20 in which the wireless device 12 is detected to be within and enable the user to start the vehicle.

The apparatus 10 may utilize remote keyless operation in addition to the PEPS function. For example, the main base station 14 may perform a desired operation (e.g., lock, unlock, lift gate release, remote start, etc.) with the vehicle 18 in the event the wireless device 12 transmits a command indicative of the desired operation while within the authorized zone 20. In addition, the apparatus 10 may be used to perform a car finder application.

In general, the main base station 14, the auxiliary base stations 16, and the wireless device 12 engage in a series of signal exchanges with one another and utilize a time of flight (TOF) implementation to determine a distance of the wireless device 12 from the vehicle 18. Thereafter, the main base station 14 and the auxiliary base stations 16 may employ trilateration to locate the actual zone 20 the wireless device 12 is positioned within. The use of trilateration enables the main base station 12 the ability to locate where the wireless device 12 is positioned horizontally from the vehicle. This information (e.g., which zone 20 the wireless device 12 is positioned within) coupled with distance information as ascertained by utilizing TOF enables the main base station 12 to locate with increased levels of accuracy the location of the wireless device 12 in relation to the vehicle 18. The apparatus 10 may be arranged to precisely determine the location of the wireless device 12 about or within the vehicle 18 as opposed to conventional systems in which perhaps only the transponder may be located at various sides of the vehicle with lesser degrees of accuracy.

For example, the main base station 14 may determine that the wireless device 12 is positioned at a distance of 3 meters away from the vehicle 18 and that the wireless device 12 is positioned in the zone 20a which corresponds to a driver side zone. While it is noted that the location of the wireless device 12 may be ascertained via the TOF and trilateration, it is recognized that the aspects noted herein with respect to locating the wireless device 12 may be applicable to other vehicle functions such as, but not limited to, tire pressure monitoring. These aspects and others will be discussed in more detail below. While utilizing the TOF, it is recognized that the main base station 14 and the auxiliary base stations 16 may be positioned at predetermined locations in the vehicle 18 for transmitting and receiving signals to and from the wireless device 12.

Figure 2:
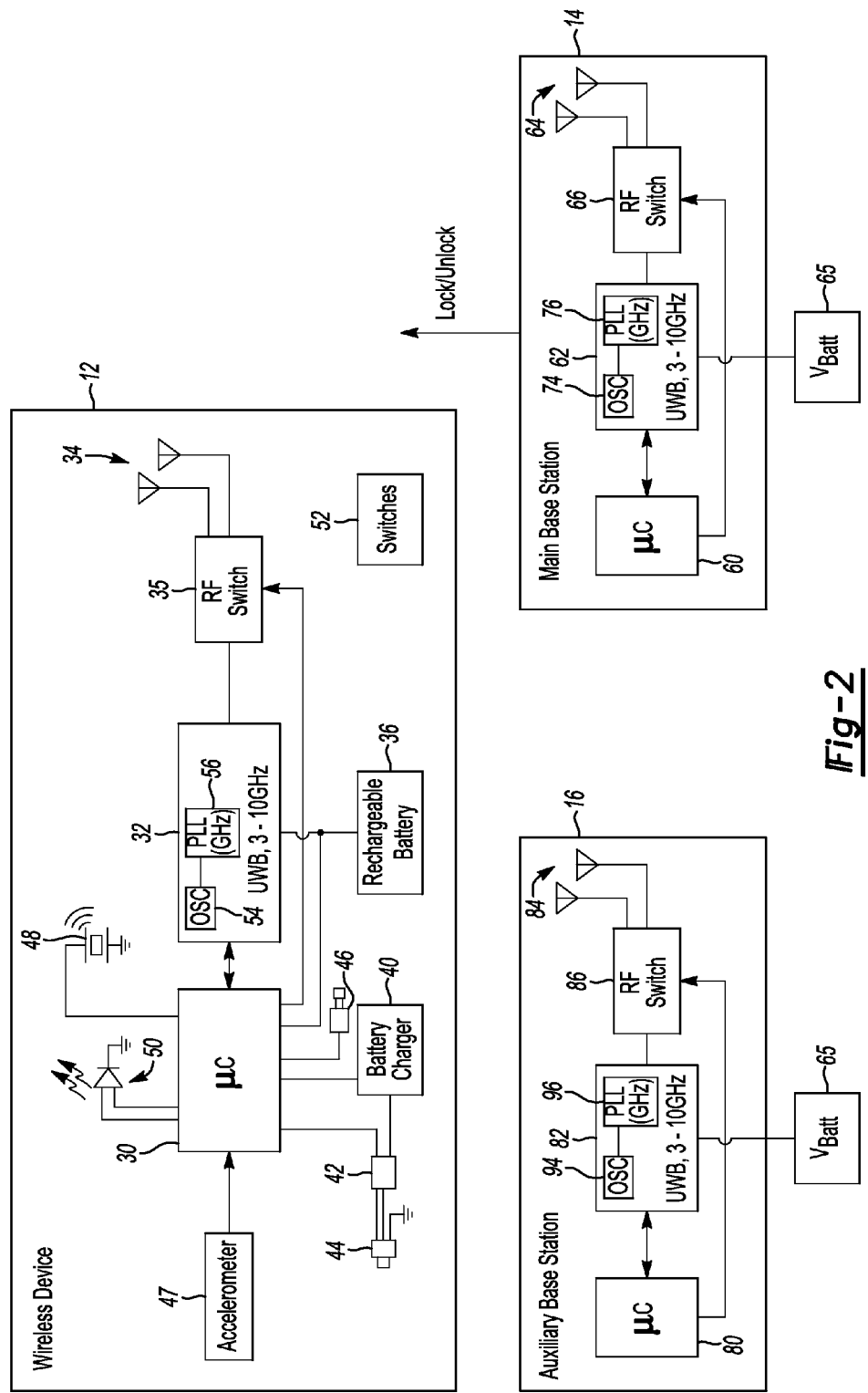
FIG. 2 depicts a detailed schematic view of the wireless device, the main base station and the auxiliary base station in accordance to one embodiment.

FIG. 2 depicts a detailed schematic view of the wireless device 12, the main base station 14, and an auxiliary base stations unit 16 in accordance to one embodiment. The wireless device 12 includes a microcontroller 30, a transmitter/receiver ("transceiver") 32, and at least one antenna 34. The microcontroller 30 is operably coupled to the transceiver 32 and the antenna 34 for transmitting and receiving signals to/from the main base station 14 and the auxiliary base stations 16. A radio frequency (RF) switch 35 is operably coupled to the antennas 34 for coupling the same to the transceiver 32. A multiple antenna 34 implementation may provide for antenna diversity which may aid with respect to radio frequency multi-paths. The use of the RF switch 35 and multiple antennas are optional. For example, a single antenna 34 may be used for transmitting and receiving signal to and from the wireless device 12.

A rechargeable battery 36 powers the microcontroller 30 and the transceiver 32. A battery charger circuit 40 receives power from a charger connector 42 that is operably coupled to an external power supply (not shown). The battery charger circuit 40 may condition the incoming power from the external power supply to ensure that it is suitable for storage on the rechargeable battery 36. It is recognized that the battery charger circuit 40 and the battery 36 may wirelessly receive power from an external device for charging the same.

The battery charger 40 may indicate to the microcontroller 30 when the battery 36 is being recharged and/or the charge state of the battery 36. A first lighting indicator 44 is positioned about the charger connector 42 and is operably coupled to the microcontroller 30 to provide charge status of the battery 36 to a user. A vibrating motor 46 is operably coupled to the microcontroller 30 and is arranged to provide a haptic feedback. An accelerometer 47 is operably coupled to the microcontroller 30 for detecting the motion of the wireless device 12. For example, the wireless device 12 may be arranged to initiate the transmission of data in response to determining that it is moving. A piezo-sounder 48 is also operably coupled to the microcontroller 30 and is arranged to provide an audio based feedback. A second lighting indicator 50 is operably coupled to the microcontroller 30 and is arranged to provide a visual feedback. A plurality of switches 52 are positioned on the wireless device 12, each for transmitting a command to the vehicle 18 such that a desired operation is performed (e.g., lock, unlock, lift gate release, remote start, etc.).

The transceiver 32 is generally configured to operate at an operating frequency of between 3-10 GHz. In general, by operating the transceiver 32 at an operating frequency of between 3-10 GHz, this condition may enable the wireless device 12, and the auxiliary base station 16 to determine a distance thereof with respect to the vehicle within a high degree of accuracy in the event the wireless device 12 engages in communication with the vehicle 18 to provide its distance from the vehicle 18. The operating frequency aspect will be discussed in more detail below. The transceiver 32 generally includes an oscillator 54 and a phase locked loop (PLL) 56 for enabling the transceiver 32 to operate at the frequency of between 3-10 GHz. By enabling the transceiver 32 to operate at an operating frequency of between 3 and 10 GHz, such a condition also enables the transceiver 32 to transmit and receive signals at an ultra-wide band (UWB) bandwidth of at least 500 MHz.

The main base station 14 generally includes a microcontroller 60, a transceiver 62, and at least one antenna 64. An RF switch 66 is operably coupled to the microcontroller 60 and to the antenna 64. The RF switch 66 is operably coupled to the antennas 64 for coupling the same to the transceiver 62. A multiple antenna 64 implementation may provide for antenna diversity which may aid with respect to RF multi-paths. It is also contemplated that a single antenna 64 may be used for transmitting and receiving signal to and from the wireless device 12 without the need for the RF switch 66. The microcontroller 60 is operably coupled to the transceiver 62 and the antenna 64 for transmitting and receiving signals to/from the wireless device 12 and the auxiliary base station 16. A power source 65 in the vehicle 18 powers the microcontroller 60 and the transceiver 62. The main base station 14 further includes circuitry (not shown) for performing locking/unlocking vehicle doors and/or a liftgate/trunk and for performing remote start operation.

The transceiver 62 is also generally configured to operate at the operating frequency of between 3-10 GHz. By operating the transceiver 62 at an operating frequency of between 3-10, at the operating frequency of between 3-10 GHz, this condition may enable the main base station 14 to determine the distance of the wireless device 12 with respect to the vehicle within a high degree of accuracy when it engages in communication with the wireless device 12. This will be discussed in more detail below. The transceiver 62 generally includes an oscillator 74 and a PLL 76 for enabling the transceiver 62 to operate at the frequency of between 3-10 GHz. The transceiver 62 is also configured to transmit and receive signals at the UWB bandwidth of at least 500 MHz. By enabling the transceiver 62 to operate at the operating frequency of between 3 and 10 GHz, such a condition also enables the transceiver 62 to transmit and receive signals at the UWB range.

The auxiliary base station 16 generally includes a microcontroller 80, a transceiver 82, and at least one antenna 84. An RF switch 86 is operably coupled to the microcontroller 60 and to the antenna 64. The RF switch 86 and multi-antenna 84 implementation is optional for the reasons noted above. The microcontroller 80 is operably coupled to the transceiver 82 and the antenna 84 for transmitting and receiving signals to/from the wireless device 12 and main base station 14. The power source 65 in the vehicle 18 powers the microcontroller 80 and the transceiver 82.

The transceiver 82 is also generally configured to operate at the operating frequency of between 3-10 GHz. By operating the transceiver 82 at an operating frequency of between 3-10 GHz, this condition may enable the auxiliary base station 16 to determine the distance of the wireless device 12 with respect to the vehicle within a high degree of accuracy when it engages in communication with the wireless device 12. This will be discussed in more detail below. The transceiver 82 generally includes an oscillator 94 and a PLL 96 for enabling the transceiver 62 to operate at the frequency of between 3-10 GHz. The transceiver 82 is also configured to transmit and receive signals at the UWB bandwidth of at least 500 MHz. It is recognized that the second auxiliary base station 16 is similar to the auxiliary base station 16 as described above and includes similar components and provides similar functionality.

The wireless device 12, the main base station 14, and the auxiliary base stations 16 are each arranged to transmit and receive data within the UWB bandwidth of at least 500 MHz, this aspect may place large current consumption requirements on such devices. For example, by operating in the UWB bandwidth range, such a condition yields a large frequency spectrum (e.g., both low frequencies as well as high frequencies) and a high time resolution which improves ranging accuracy. Power consumption may not be an issue for the main base station 14 and the auxiliary base station 16 since such devices are powered from the power source 65 in the vehicle. However, this may be an issue for the wireless device 12 since it is a portable device. Generally, portable devices are equipped with a standalone battery. In the event the standalone battery is implemented in connection with the wireless device 12 that transmits/receives data in the UWB bandwidth range, the battery may be depleted rather quickly. To account for this condition, the wireless device 12 includes the rechargeable battery 36 and the battery charger circuit 40, along with the charger connector 42 (or wireless implementation) such that the battery 36 can be recharged as needed to support the power demands used in connection with transmitting/receiving information in the UWB bandwidth range.

In general, the larger the operating frequency of the transceivers 32, 62, and 82; the larger the bandwidth that such transceivers 32, 62, and 82 can transmit and receive information. Such a large bandwidth (i.e., in the UWB bandwidth) may improve noise immunity and improve signal propagation. This may also improve the accuracy in determining the distance of the wireless device 12 since UWB bandwidth allows a more reliable signal transmission. As noted above, an operating frequency of 3-10 GHz enables the transceivers 32, 62, and 82 to transmit and receive data in the UWB range. The utilization of the UWB bandwidth for the wireless device 12, the main base station 14, and the auxiliary base stations 16 may provide for (i) the penetration of the transmitted signals to be received through obstacles (e.g., improved noise immunity), (ii) high ranging (or positioning) accuracy, (iii) high-speed data communications, and (iv) a low cost implementation. Due to the plurality of frequency components in the UWB spectrum, transmitted data may be received at the wireless device 12, the main base station 14, and the auxiliary base station 16 more reliably when compared to data that is transmitted in connection with a narrow band implementation (e.g., carrier frequency based transmission at 315 MHz, etc.). For example, UWB based signals may have both good reflection and transmission properties due to the plurality of frequency components associated therewith. Some of the frequency components may transmit through various objects while others may reflect well off of objects. These conditions may increase the reliability in the overall reception of data at the wireless device 12, the main base station 14, and the auxiliary base stations 16. Further, transmission in the UWB spectrum may provide for robust wireless performance against jamming. This may also provide for an anti-relay attack countermeasure and the proper resolution to measure within, for example, a few centimeters of resolution.

The implementation of UWB in the wireless device 12, the main base station 14, and the auxiliary base station 16 is generally suitable for TOF applications.

Figure 3:
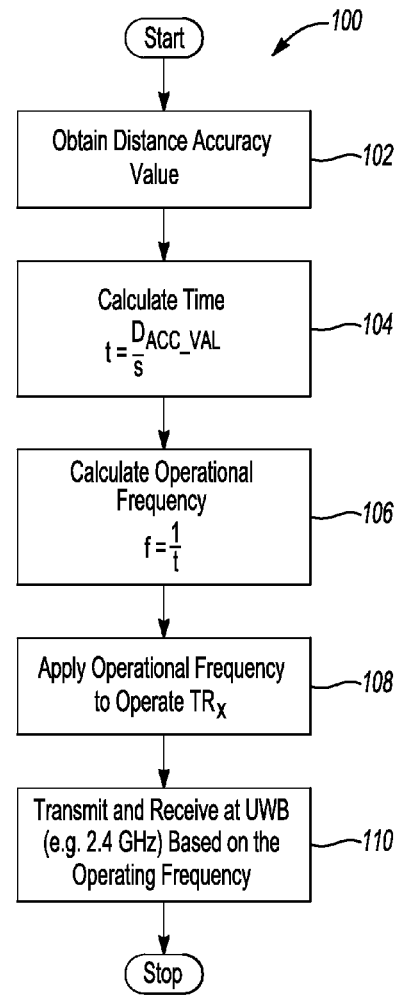
FIG. 3 depicts a method for determining an operating frequency of a transceiver on the wireless device, the main base station, and the auxiliary base station(s) in accordance to one embodiment.

FIG. 3 depicts a method 100 for determining the operating frequency of one or more transceivers 32, 62, and 82 on the wireless device 12, the main base station 14, and the auxiliary base station 16, respectively, in accordance to one embodiment. As noted above, by operating the transceiver 32, 62, and 82 at an operating frequency of between 3-10 GHz, this condition may enable the main base station 14 and the auxiliary base stations 16 to accurately determine the distance of the wireless device 12 at a high resolution. Further, the specified operating frequency as noted above, also enables the transceivers 32, 62, and 82 the ability to process time measurements with regard to TOF within a high resolution. The operations as set forth below generally indicate a correlation between the operating frequency and precision of the distance of the wireless device 12 from the vehicle 18. The precision of the distance determination may be a function of the operating frequency and the UWB bandwidth.

In general, the main base station 14 engages in TOF measurements with the wireless device 12 to provide a first distance, $D_1$ with respect to the distance of the wireless device 12 from the main base station 14. In addition, the auxiliary base station 16a engages in TOF measurements with the wireless device 12 to provide a second distance, $D_2$ with respect to the distance of the wireless device 12 from each auxiliary base station. In addition, the auxiliary base station 16n also engages in TOF measurements with the wireless device 12 to provide a third distance, $D_3$ with respect to the distance of the wireless device 12 from each auxiliary base station. At least three distance readings are needed such that trilateration is performed with the same to determine the zone 20 in which the wireless device 12 is located in (See FIG. 5). It is also contemplated that the wireless device 12 may provide its own distance with respect to the vehicle using TOF measurements with the main base station 14 or the auxiliary base station 16.

In operation 102, a distance accuracy value, $D_{ACC\_VAL}$ is provided which is generally indicative of a tolerance with respect to where the wireless device 12 is located from the vehicle 18. The wireless device 12, the main base station 14, and the auxiliary base stations 16 account for the distance accuracy value when such devices are arranged to provide a distance reading of the wireless device 12.

Each distance reading as provided (e.g., the first distance $D_1$, the second distance $D_2$, and the third distance $D_3$) may be defined as:

$$f(D_1,D_2,D_3)=D_{actual}+/-D_{ACC\_VAL} \quad \text{(Eq. 1)}$$

where $D_{actual}$ is the actual distance of where the wireless device 12 is actually located with respect to the vehicle 18. As shown, $D_{ACC\_VAL}$ is generally indicative of a tolerance value. It is recognized that it may be difficult for the apparatus 10 to provide the actual distance of the wireless device 12 in relation to the vehicle due to some degree of error. It can be shown that $D_{ACC\_VAL}$ is directly proportional to the operating frequency in which the wireless device 12, the main base station 14, and the auxiliary base station 16 operate at. If a larger tolerance of $D_{ACC\_VAL}$ is desired or acceptable in terms of the distance of the wireless device 12 from the vehicle 18, then the operating frequency may be lower. If a smaller tolerance of $D_{ACC\_VAL}$ is required in terms of the distance of the wireless device 12 from the vehicle 18, then the operating frequency may be higher. The correlation between operating frequency and $D_{ACC\_VAL}$ is shown below.

For example, in operation 104, once the distance accuracy value has been obtained or provided (e.g., this may be a customer requirement in order to achieve a desired resolution in terms of the distance determination of the wireless device 12), time (t) may be calculated by the following:

$$t=D_{ACC\_VAL}/s \quad \text{(Eq. 2)}$$

where s is the speed of light (i.e., a constant).

In operation 106, the operational frequency, $f_{op}$ is obtained by the following:

$$f_{op}=1/t \quad \text{(Eq. 3)}$$

In operation 108, the operational frequency is then applied to the transceivers 32, 62, and 82 on the wireless device 12, the main base station 14, and the auxiliary base stations 16, respectively. Assuming, $D_{ACC\_VAL}$ is 10 cm, then execution of Eq. 2 and Eq. 3 will reveal that the operating frequency $f_{op}$ of the wireless device 12, the main base station 14, and the auxiliary base stations 16 is 3.33 GHz.

In operation 110, the wireless device 12, the main base station 14, and the auxiliary base stations 16 transmit and receive data at the operational frequency $f_{op}$, to and from one another in the UWB bandwidth range.

Figure 4:
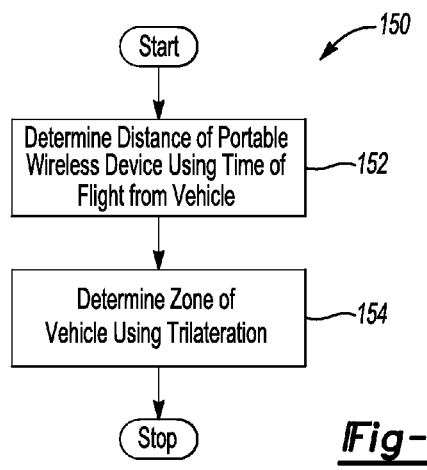
FIG. 4 depicts a method for detecting the location of the wireless device in accordance to one embodiment.

FIG. 4 depicts a method 150 for detecting the location of the wireless device 12 in accordance to one embodiment.

In operation 152, the apparatus 10 determines the distance of the wireless device 12 using TOF measurements. TOF is known to be based on the time required for a wireless signal to travel from a first location to a second location, in which the time is generally indicative of the distance between the first location and the second location. This can be extended to apply to the apparatus 10. For example, the apparatus 10 may measure the time required for data (or information) to be transmitted from the wireless device 12 and to one or more of the main base station 14 and the auxiliary base station 16 and determine the distance in which the wireless device 12 is located from the vehicle 18 based on the time measurements.

To begin the process of determining the location of the wireless device 12 with respect to the vehicle 18, the wireless device 12 may transmit a polling signal to determine if it proximate to the vehicle 18. In this case, the wireless device 12 may periodically transmit the polling signal in response to detecting a motion thereof. The accelerometer 47 within the wireless device 12 may transmit a motion signal to the microcontroller 30 that indicates that the wireless device 12 is in motion. Any one of the main base station 14 and the auxiliary base stations 16 may receive the polling signal and respond back to the wireless device 12. For example, assuming, the main base station 14 receives the polling signal, the main base station 14 may then transmit a first signal and include a first time stamp therein. The first signal is transmitted to the wireless device 12. The wireless device 12 receives the first signal with the first time stamp and generates a second signal including a second time stamp corresponding to the time it received the first signal. The wireless device 12 transmits the second signal back to the main base station 14. The main base station 14 may then determine a round trip time based on the first time stamp and on the second time stamp. The round trip time may correspond to the time measurement which is indicative of the distance between wireless device 12 and the main base station 14. This exchange may be repeated any number of times such that any number of time measurements may be ascertained. Multiple measurements may improve the accuracy of the distance determination. The main base station 14 stores the first distance D1 once determined in response to the time measurements.

After exchanging signals between the wireless device 12 and the main base station 14 to determine the first distance D1, the wireless device 12 and the auxiliary base station 16a may engage in a similar exchange (e.g., insertion of time stamps) such that the second distance D2 is obtained which corresponds to the distance between the wireless device 12 and the auxiliary base station 16a. Again, multiple signal exchanges with multiple time stamps may be used to improve the accuracy of the distance determination. The auxiliary base station 16a stores the second distance D2 once determined in response to the time measurements.

After exchanging signals between the wireless device 12 and the auxiliary base station 16a to determine the second distance D2, the wireless device 12 and the auxiliary base station 16n may engage in a similar exchange (e.g., insertion of time stamps) such that the third distance D3 is obtained which corresponds to the distance between the wireless device 12 and the auxiliary base station 16n. Multiple signal exchanges with multiple time stamps may be used to improve the accuracy of the distance determination. The auxiliary base station 16n stores the third distance d3 once determined.

It is to be noted that the above signal exchange between the wireless device 12, the main base station 14, and auxiliary base stations 16 may take into account delay times generally associated with electronics in the wireless device 12 and in the base stations 14, 16 for providing the time measurements.

Once the auxiliary base stations 16a and 16n determine the second distance D2 and the third distance D3, each of the auxiliary base stations 16a and 16n may wirelessly transmit such data to the main base station 14. The main base station 14 uses the distances D1, D2, and D3 to determine which zone 20 the wireless device 12 is positioned in. This will be discussed in more detail below. The utilization of the operating frequency at between 3-10 GHz and the transmission/reception of information within the UWB bandwidth generally enables the wireless device 12, the main base station 14, and the auxiliary base stations 16 to process the time measurement with a high degree of resolution so that the main base station 14 and the auxiliary base stations 16 each provide a corresponding distance (e.g., D1, D2, and D3) within a high degree of resolution.

While it has been noted that the main base station 14 may receive the distances D2, D3 from the auxiliary base stations 16 and to determine the location of the wireless device 12, it is contemplated that the wireless device 12 itself may provide a distance reading in a similar manner to that stated above while engaging in TOF measurements with the main base station 14 and/or the auxiliary base stations 16 while also operating at the operating frequency corresponding to the distance accuracy value $D_{ACC\_VAL}$. In this case, the wireless device 12 may provide a distance reading to the main base station 14. The main base station 14 may then use the distance reading from the wireless device 12 and those from the auxiliary base station(s) 16 to determine the location of the wireless device 12.

Figure 5:
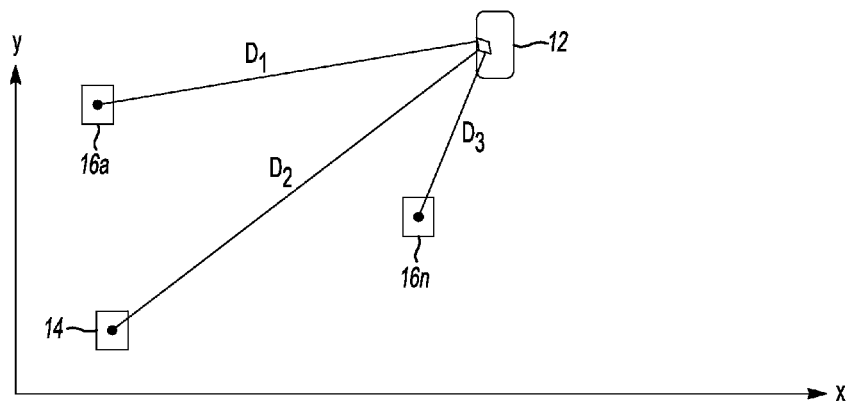
FIG. 5 depicts a first distance, a second distance, and a third distance of the wireless device from the vehicle in accordance to one embodiment.

FIG. 5 generally illustrates the distances (e.g., d1, d2, and d3) as determined by the main base station 14, the auxiliary base station 16a, and the auxiliary base station 16n. It is recognized that at least three reference points (or three distance measurements (e.g., d1, d2, and d3)) may be needed for the main base station 14 to ascertain which zone 20a-20n the wireless device is located in when the main base station 14 performs trilateration.

In operation 154, the main base station 14 employs trilateration to determine the zone 20a-20n in which the wireless device 12 is positioned. As noted above, the apparatus 10 may use the TOF implementation to ascertain the distance (e.g., D1, D2, D3) of the wireless device 12 from the vehicle 18. However, the zone 20 in which the wireless device 12 is positioned in may not be known even if the distances (e.g., D1, D2, D3) are known.

Generally, trilateration employs determining an absolute or relative location of points via measurement of distance by examining the geometry of circles, spheres, or triangles. An example of trilateration is set forth in "Intersection of two circles," Paul Bourke, April 1997 and in "Trilateration," Alan Kaminsky, Mar. 8, 2007. For example, the main base station 14 may use the three distances d1, d2, and d3 and utilize trilateration to find coordinates (e.g., zone) that the wireless device 12 is positioned in. The coordinates of the wireless device 12 may correspond to a point in the x, y, z axis. Once the final coordinates are ascertained, the main base station 14 may perform a predetermined operation based on the final coordinates of the wireless device 12. For example, the main base station 14 may unlock a door or liftgate. In another example, the main base station 14 may send a message over a communication bus to enable a remote start operation. Any number of vehicle operations may be performed once the final coordinates are ascertained.

It is also recognized that the wireless device 12 may also perform trilateration instead of the main base station 14. For example, as noted above, the wireless device 12 may use the distance reading that it has calculated in addition to the distance readings (e.g., D1, D2, and/or D3) from the main base station 14, the auxiliary base station 16a, and/or the auxiliary base station 16n and perform the trilateration with these readings to determine the zone 20 in which the wireless device 12 is positioned. This information can be sent to the main base station 14.

Figure 6:
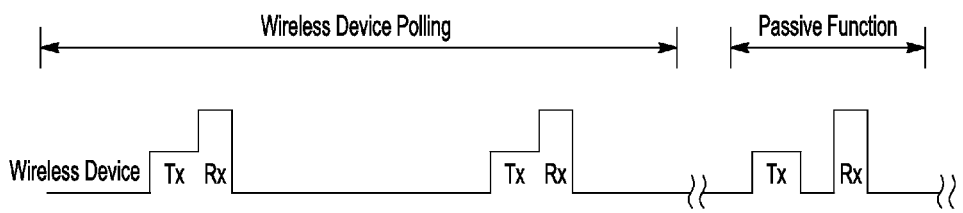
FIG. 6 depicts the manner in which the wireless device polls for a signal from the vehicle in accordance to one embodiment.

FIG. 6 depicts the manner in which the wireless device 12 polls for a signal from one or more of the main base station 14 and the auxiliary base stations 16 in accordance to one embodiment.

Figure 7:
FIG. 7 depicts the manner in which the main base station monitors for the wireless device in accordance to one embodiment.

FIG. 7 depicts the manner in which the main base station 14 and/or the auxiliary base stations 16 poll for a signal from the wireless device 12 in accordance to one embodiment.

Figure 8:
FIG. 8 depicts the manner in which the wireless device is actuated by a user and timing of the receiver in the vehicle in accordance to one embodiment.

FIG. 8 depicts the manner in which the wireless device 12 is actuated by a user and the relationship to timing of the main base station 14 and/or the base stations 16 in the vehicle 18 in accordance to one embodiment.

Figure 9:
FIG. 9 depicts the wireless device polling internally to check for movement in accordance to one embodiment.

FIG. 9 depicts the wireless device 12 polling internally to check for movement in accordance to one embodiment. As noted above, the wireless device 12 includes accelerometer 47 for determining whether the wireless device 12 is moving. This may serve as a trigger mechanism for the wireless device 12 to initiate transmission of the polling signal as noted above in connection with FIG. 4 such that TOF measurements can be performed thereafter by the main base station 14 and the auxiliary base station 16.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for determining a location of a portable wireless device in relation to a vehicle, the apparatus comprising:

a first base station including a first transceiver for being positioned about the vehicle, the first transceiver being configured to operate at a first operating frequency for transmitting and receiving at least one first signal to and from the portable wireless device to provide a first distance of the portable wireless device with respect to the vehicle; the first operating frequency corresponding to a distance accuracy value and the first distance generally corresponding to an actual distance of the portable wireless device from the vehicle that is adjusted by the distance accuracy value;

a second base station including a second transceiver for being positioned about the vehicle, the second transceiver being configured to operate at a second operating frequency for transmitting and receiving at least one second signal to and from the portable wireless device to provide a second distance of the portable wireless device with respect to the vehicle; and a third base station including a third transceiver for being positioned about the vehicle, the third transceiver being configured to operate at a third operating frequency for transmitting and receiving at least one third signal to and from the portable wireless device to provide a third distance of the portable wireless device with respect to the vehicle, wherein the second base station is further configured to wirelessly transmit a second distance signal indicative of the second distance to the first base station and the third base station is further configured to wirelessly transmit a third distance signal indicative of the third distance to the first base station, and wherein the first base station is further configured to perform trilateration with the first distance, the second distance, and the third distance to determine a zone in which the portable wireless device is positioned.

2. The apparatus of claim 1 wherein the first operating frequency, the second operating frequency, and the third operating frequency are the same.

3. The apparatus of claim 1 wherein the zone in which the portable wireless device is positioned and at least one of the first distance, the second distance, and the third distance are indicative of the location of the portable wireless device with respect to the vehicle.

4. The apparatus of claim 1 wherein the first operating frequency is between 3 GHz and 10 GHz.

5. The apparatus of claim 1 wherein the first base station is further configured to transmit and receive the at least one first signal to and from the portable wireless device within an ultra-wide band (UWB) bandwidth.

6. The apparatus of claim 1 wherein the first base station is further configured to transmit and receive the at least one first signal with the portable wireless device to measure a time of flight such that the first distance of the portable wireless device is determined in response thereto.

7. A method for determining a location of a portable wireless device in relation to a vehicle, the method comprising:

operating a first transceiver of a first base station, that is positioned about a vehicle, at a first operating frequency for transmitting and receiving at least one first signal to and from the portable wireless device;

providing a first distance of the portable wireless device with respect to the vehicle, the first operating frequency corresponding to a distance accuracy value and the first distance generally corresponding to an actual distance of the portable wireless device from the vehicle that is adjusted by the distance accuracy value;

operating a second transceiver of a second base station at a second operating frequency for transmitting and receiving at least one second signal to and from the portable wireless device to provide a second distance of the portable wireless device with respect to the vehicle; and operating a third transceiver of a third base station at a third operating frequency for transmitting and receiving at least one third signal to and from the portable wireless device to provide a third distance of the portable wireless device with respect to the vehicle, wirelessly transmitting, via the second base station, a second distance signal indicative of the second distance to the first base station;

wirelessly transmitting, via the third base station, a third distance signal indicative of the third distance to the first base station, and performing, via the first base station, trilateration with the first distance, the second distance, and the third distance to determine a zone in which the portable wireless device is positioned.

8. The method of claim 7 wherein the first operating frequency, the second operating frequency, and the third operating frequency are the same.

9. The method of claim 7 further comprising measuring a time of flight of the at least one first signal, the at least one second signal, and the at least one of the third signal to provide the first distance, the second distance, and the third distance, respectively.

\* \* \* \* \*